United States Patent [19]

Cawley et al.

[11] Patent Number: 4,622,772

[45] Date of Patent: Nov. 18, 1986

[54] FISHING LURE RETRIEVER

[76] Inventors: James M. Cawley, 2701 Greendale Dr., Sarasota, Fla. 33582; John W. Chonody, 807 Church St., Nokomis, Fla. 33555

[21] Appl. No.: 700,524

[22] Filed: Feb. 11, 1985

[51] Int. Cl.⁴ .............................................. A01K 97/00
[52] U.S. Cl. ....................................................... 43/17.2
[58] Field of Search ........................... 43/17.2, 53.5, 5

[56] References Cited

U.S. PATENT DOCUMENTS

| | | | |
|---|---|---|---|
| 2,083,814 | 6/1937 | Bence | 43/1 |
| 2,344,838 | 3/1944 | VanSickle | 43/17.2 |
| 2,718,084 | 9/1955 | Gustafson | 43/17.2 |
| 2,732,650 | 1/1956 | Passmore | 43/17.2 |
| 2,768,462 | 10/1956 | Younce | 43/17.2 |
| 2,940,203 | 6/1960 | Carter | 43/17.2 |
| 2,948,077 | 8/1960 | Karpes | 43/17.2 |
| 3,693,280 | 9/1972 | Calhoun | 43/17.2 |
| 3,743,338 | 7/1973 | Seeger | 294/19 A |
| 4,086,718 | 5/1978 | Swanson | 43/17.2 |
| 4,322,939 | 4/1982 | McDonald | 294/19 A |
| 4,334,707 | 6/1982 | Phillips | 294/19 A |
| 4,395,840 | 8/1983 | Banks | 43/17.2 |
| 4,508,467 | 4/1985 | Choffin | 43/17.2 |

Primary Examiner—Gene P. Crosby
Attorney, Agent, or Firm—Benjamin P. Reese, II; Philip G. Meyers

[57] ABSTRACT

A fishing lure retriever having a plurality of flexible loops for engaging one or more hooks on the lure to be retrieved. The flexible loops are mounted on, and extend outward at various angles from, one end of an elongated handle or pole. A fishing line guide having an open outlet for engaging the fishing line is transversely mounted on the handle or pole near the same end. The handle or pole is preferably telescoping.

23 Claims, 8 Drawing Figures

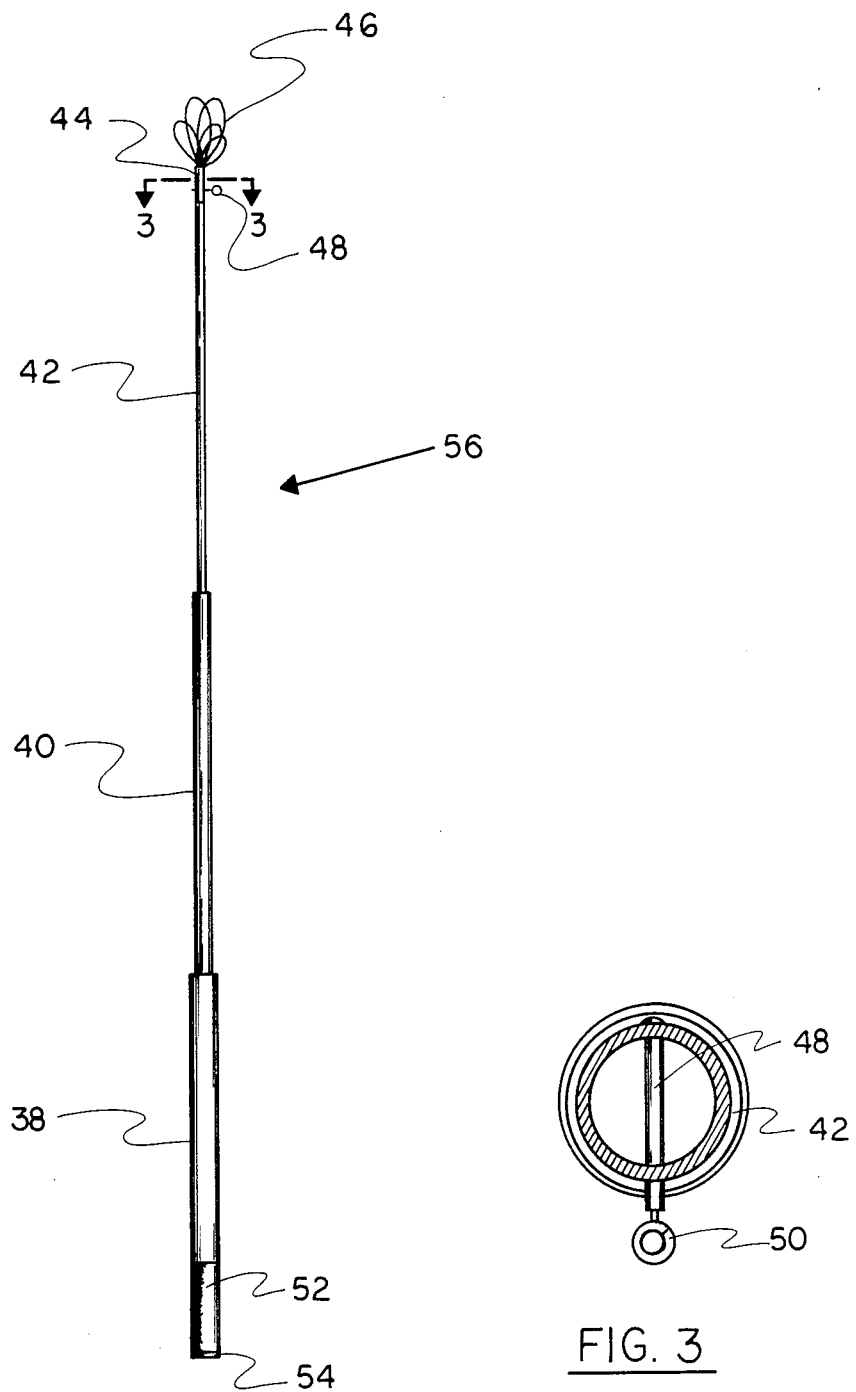

FISHING LURE RETRIEVER

BACKGROUND OF THE INVENTION

This invention relates generally to a fishing lure retriever comprising an elongated handle or pole having a retrieving head on one of its ends, and, more particularly, to such a retriever having a retrieving head comprising a plurality of flexible loops for engaging one or more hooks on the lure to be retrieved.

Various fishing lure retrievers are provided by the prior art. Typically, such retrievers comprise an elongated, telescoping handle or pole having a retrieving head on one of its ends. For at least one of such retrievers, the retrieving head is a wire loop. And, for various other retrievers, e.g. golf ball retrievers and fruit gatherers, provided by the prior art, the retrieving head comprises a plurality of wire loops. However, it is not believed that the prior art provides a fishing lure retriever or any other similar retriever having a retrieving head comprising a plurality of flexible loops.

Fishing lure retrievers having essentially rigid retrieving heads, e.g. wire loops, wire spirals, wire mesh and frames, split rings, and forked tips, require substantial skill for use by a fisherman. With certain of such retrievers, the fisherman must perform extensive manipulations to pry the snagged hook or hooks of the lure from the stump, log or the like. Other of such retrievers require the fisherman to precisely position the retrieving head to engage the snagged hook or hooks or the lure itself. None of such retrievers are particularly suitable for retrieving snagged lures from trees or the like above the surface of the water or on its adjacent shore.

SUMMARY OF THE INVENTION

The present invention provides a fishing lure retriever having a retrieving head comprising a plurality of flexible loops for engaging one or more hooks on the lure to be retrieved.

The fishing lure retriever comprises an elongated handle or pole and a plurality of flexible loops. The loops are mounted on, and extend at various angles from, one end of the pole to function as a retrieving head. A fishing line guide having an open eyelet is transversely mounted on the pole near the same end.

The fishing lure retriever is used to retrieve a snagged lure by engaging the fishing line with the eyelet, pushing the retriever to the lure, engaging one or more of the free hooks on the lure with the flexible loops, unsnagging the lure by rotating or pushing the retriever, or both, and pulling the lure with the retriever. After the lure has been retrieved, the fishing line and hooks are disengaged. The retriever can be used in a similar manner to land a fish without injury to the fish.

These and many other advantages, features and objects of the present invention will be apparent from the following brief description of the drawings, description of the preferred embodiment and claims, and the accompanying drawings.

BRIEF DESCRIPTION OF THE DRAWINGS

FIG. 2 is a side elevational view of the fishing lure retriever with its flexible loops mounted on the retrieving end of a telescoping pole.

FIG. 3 is a cross sectional view taken along line 3—3 in FIG. 2.

DESCRIPTION OF THE PREFERRED EMBODIMENT

The preferred embodiment of the fishing lure retriever of the present invention is shown in FIGS. 1-7.

Figures 1, 1A:
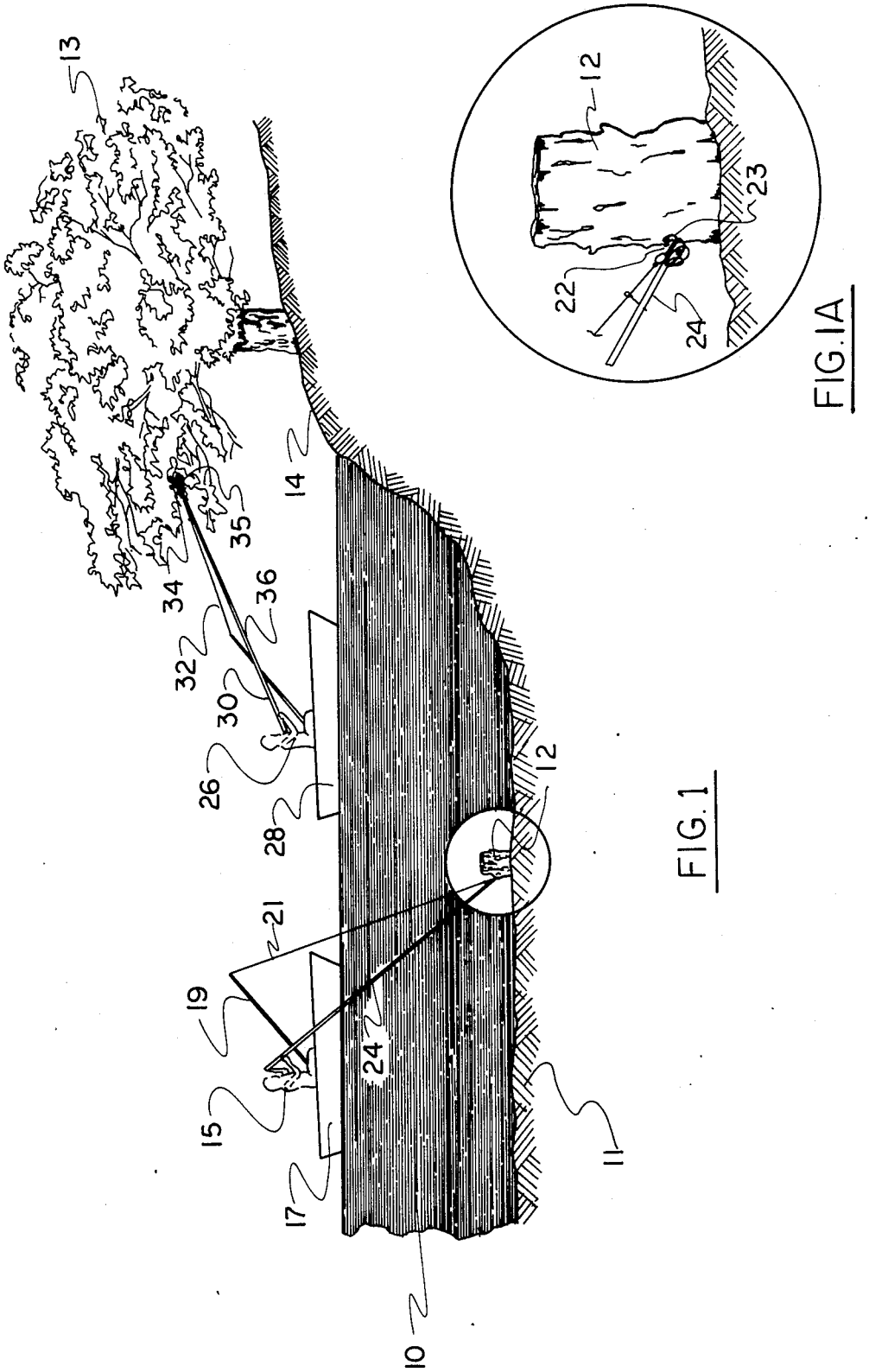
FIG. 1 is a fragmentary, vertical section of a body of water showing a stump below the water and a tree on the adjacent shore and two fishermen, each using the fishing lure retriever of the present invention to retrieve snagged lures.
FIG. 1A is an enlarged view of the circled portion of FIG. 1 showing a submerged stump.

Referring to FIG. 1, a body of water 10 having a bottom 11 with a stump 12 and a tree 13 on the adjacent shore 14 constitute an illustrative environment for use of the fishing lure retriever of the present invention. A fisherman 15 is shown in a boat 17 on the body of water 10 using a fishing pole 19 having a fishing line 21 extended therefrom to a fishing lure 22 snagged on the submerged stump 12. The fisherman 15 is shown using a retriever 24 embodying concepts of the present invention to retrieve the snagged lure 22. Similarly, a fisherman 26 is shown in a boat 28 using a fishing pole 30 having a fishing line 32 extended therefrom to a fishing lure 34 snagged in the tree 13. The fisherman 26 is shown using an identical retriever 36 to retrieve the snagged lure 34.

The fishing lure retriever 24, 36 comprises any suitable elongated handle or pole 56, preferably, but not necessarily, consisting of a plurality of telescopic segments 38, 40 and 42 as shown in FIG. 2, and a plurality of flexible loops 46. As best shown in FIG. 2, the flexible loops 46 are mounted on, and extend outward at various angles from, the free end 44 of telescopic segment 42, i.e. the retrieving end 44 of the pole 56, to function as a retrieving head. Preferably, the flexible loops 46 are formed from sixty pound test monofilament nylon line. However, monofilament nylon line of approximately fifty pound test to approximately one hundred-fifty pound test and other single or multiple strand material can be used to form the flexible loops 46. Whatever material is used must have sufficient stiffness for the flexible loops 46 to maintain their shape without a support frame or the like and sufficient flexibility for the flexible loops 46 to engage one or more of the free hooks 23, 35 of the snagged lure 22, 34 without extensive manipulation or precise positioning by the fisherman 15, 26.

A fishing line guide 48 having an open eyelet 50 is transversely mounted on telescopic segment 42 near its free end 44 by any suitable means, e.g. attachment in transverse holes in segment 42 as shown in FIG. 3. The eyelet 50 is preferably in the form of a spiral which extends through slightly more than three hundred sixty degrees for ease of insertion and removal of the fishing line 21, 32 during use of the retriever 24, 36 by the fisherman 15, 26. A plastic or rubber grip 52 is provided on the free end 54 of telescopic segment 38, i.e. the operating end 54 of the pole 56, for the convenience of the fisherman 15, 26. If desired, the free end 54 may also be provided with a holding loop, not shown, or other similar accessory which makes the task of holding and using the retriever 24, 36 easier for the fisherman 15, 26.

Figure 4:
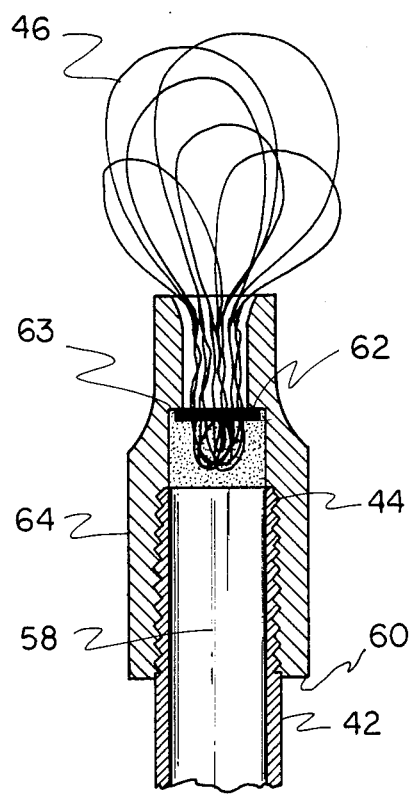
FIG. 4 is a detailed sectional view showing one means for mounting the flexible loops on the retrieving end of the pole.

Three alternate means for mounting the flexible loops 46 on the free end 44 of telescopic segment 42, i.e. the retrieving end 44 of the pole 56, are shown in FIGS. 4-7. Referring first to FIG. 4, the free end 44 of telescopic segment 42 is provided with exterior threads. Matching interior threads are provided on the rear portion of the open bore 58 of an essentially cylindrical tip 64. To mount the flexible loops 46, a monofilament nylon line is first looped several times in or on a suitable fixture. Then, a metal wire 62 or the like is crimped around one end of the flexible loops 46 and the other end of the flexible loops 46 is pulled through the bore 58 from rear to front until the crimped wire 62 engages a seat 63 formed by an abrupt change in the diameter of the bore 58. Next, an epoxy or other suitable, non-water soluble, cementitiuous material is packed into the unthreaded portion of the bore 58. Finally, following curing of the epoxy or other suitable, non-water soluble, cementitiuous material, the tip 64 is screwed onto the free end 44 of telescopic segment 42.

Figure 5:
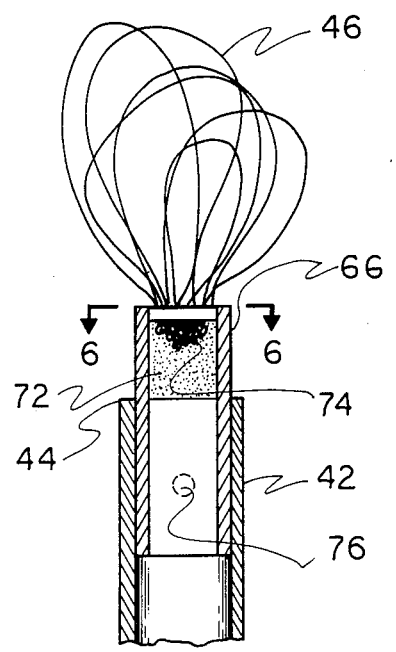
FIG. 5 is a detail sectional view showing another means for mounting the flexible loops on the retrieving end of the pole.
Figure 6:
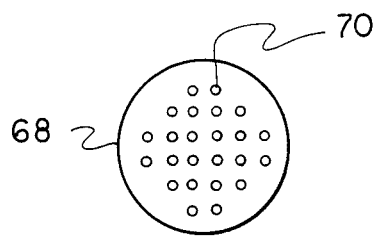
FIG. 6 is a cross sectional view taken along 6—6 of FIG. 5.

Referring now to FIGS. 5 and 6, an open bore, cylindrical tip 66 is provided with a closed end 68 having a plurality of holes 70. To mount the flexible loops 46, a monofilament nylon line is looped through the holes 70. One end of each of the flexible loops 46 is knotted in the bore 72 and an epoxy or other suitable, non-water soluble, cementitiuous material is packed around the knots 74 to retain the flexible loops 46. Following curing of the epoxy or other suitable, non-water soluble, cementitiuous material, the tip 66 is inserted in the free end 44 of telescopic segment 42 and locked into position with a blind rivet 76 or the like. Alternatively, the tip 66 which is shown in FIGS. 5 and 6 can be formed with its bore 72 larger than the outer diameter of the free end 44 of telescopic segment 42 and fitted over the free end 44. And, of course, matching threads could be substituted for the blind rivet 76 or the like.

Figure 7:
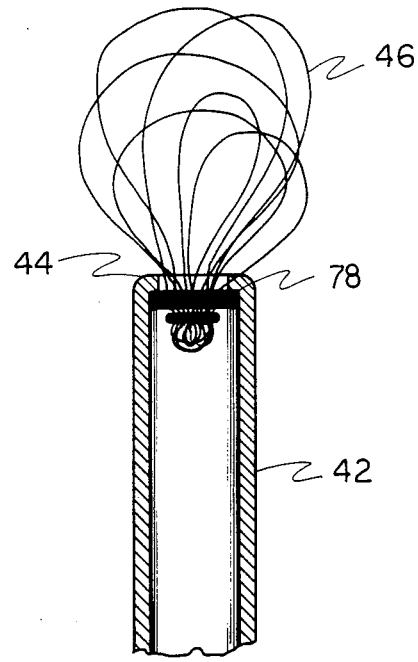
FIG. 7 is a detail sectional view showing still another means for mounting the flexible loops on the retrieving end of the pole.

Referring now to FIG. 7, a monofilament nylon line is first looped several times in or on a suitable fixture. Then, a metal wire 78 or the like is crimped around one end of the flexible loops 46 to form a ring having an outer diameter slightly larger than the inner diameter of telescopic segment 42 and force fitted in the free end 44. Finally, the free end 44 is deformed around the crimped metal wire 78 to prevent its withdrawal during use of the retriever 24, 36. An epoxy or other suitable non-water soluble, cementitiuous material can be packed in the free end 44 if desired.

Having described the structure of the fishing lure retriever 24, 26, its use will now be described. The retriever 24, 36 is conveniently carried and stored with telescopic segments 38, 40 and 42 of the pole 56 retracted. However, when it is desirable to use the retriever 24, 36, it is convenient to extend telescopic segments 38, 40 and 42 to increase its reach.

Returning to FIG. 1, when a fishing lure 22, 34 is snagged on an obstruction, e.g. a stump 12 or a tree 13, the fisherman 15, 36 engages the fishing line 21, 32 with the eyelet 50 of the fishing line guide 48 and pushes the retriever 24, 36 to the lure 22, 34. Then, the fisherman 15, 26 either rotates the pole 56 about its longitudinal axis or moves it back and forth along its longitudinal axis, or both, until the flexible loops 46 engage one or more of the free hooks 23, 35 on the lure 22, 34. Pushing the lure retriever 24, 36 toward the snagged lure 22, 34 can compress the flexible loops 46 between the snagged lure 22, 34 at the tip 66 of the lure retriever 24, 36 so that the loops 46 assume a flattened arrangement. After one or more of the free hooks 23, 35 have been engaged, the fisherman unsnags the lure 22, 34 by rotating the pole 56 about its longitudinal axis or pushing it along its longitudinal axis, or both.

After the lure 22, 34 has been unsnagged, the fisherman 15, 36 lifts the pole 56 slightly to clear any intervening brush, grass or the like and pulls the lure 22, 34 to the boat 17, 28. When the lure 22, 34 is safely in the boat 17, 28, the fisherman 15, 26 removes the fishing line 21, 32 from the eyelet 50 and disengages the hook or hooks 23, 35 from the flexible loops 46. Occasionally, it is necessary to cut one or more of the flexible loops 46 to disengage the hook or hooks 23, 35. Accordingly, it is preferable to removeably mount the flexible loops 46 on the free end 44 of telescopic segment 42. This can be conveniently accomplished by providing the tip 64 and flexible loops 46 as shown in FIG. 4 or the tip 66 and flexible loops 46 as shown in FIGS. 5 and 6 as a unitary replacement part.

It will be readily appreciated by those skilled in the fishing arts that the fishing lure retriever 24, 36 is adaptable for other fishing related uses which are not shown in FIG. 1. For example, the retriever 24, 36 can be used in place of a gaff to land fish. The fisherman 15, 36 engages the fishing line 21, 32 with the eyelet 50 of the fishing line guide 48 and pushes the retriever 24, 36 to the fish. Then, the fisherman 15, 36 either rotates the pole 56 about its longitudinal axis or moves it back and forth along its longitudinal axis, or both, until the flexible loops 46 engage on or more of the free hooks 23, 35 on the lure 22, 34. After one or more of the free hooks 23, 35 have been engaged, the fisherman 15, 36 lifts the pole 56 slightly to clear any intervening brush, grass or the like and pulls the fish to the boat 17, 28. Finally, indicia could be provided on the pole 56 to permit the retriever 24, 36 to be used to measure fish or the distance to the bottom 11 of the body of water 10.

While the present invention has been discussed in connection with its preferred embodiment, it should be understood that there may be other embodiments which fall within the scope and spirit of the invention as defined by the claims.

We claim:

1. A fishing lure retriever, comprising:
    an elongated pole; and
    a plurality of loops made of a resilient strand material, said loops being flexible and capable of being compressed into a flattened arrangement around a lure but having sufficient stiffness to recover and maintain their loop shape; and
    means for securing said loops to one end of said pole so that said loops extend from said one end of said pole.

2. A fishing lure retriever as recited in claim 1, wherein said flexible loops are formed from monofilament line.

3. A fishing lure retriever as recited in claim 2, wherein said monofilament line is nylons of approximately fifty pound test to approximately one hundred fifty pound test.

4. A fishing lure retriever as recited in claim 1, wherein said flexible loops extend outward at different angles from said end of said elongated pole.

5. A fishing lure retriever as recited in claim 1, further comprising a fishing line guide mounted on said elongated pole near said end on which said flexible loops are mounted.

6. A fishing lure retriever as recited in claim 5, wherein said fishing line guide includes an open eyelet for receipt of the fishing line.

7. A fishing lure retriever as recited in claim 6, wherein said open eyelet is in the form of a spiral.

8. A fishing lure retriever as recited in claim 1, wherein said elongated pole comprises a plurality of telescopic segments.

9. A fishing lure retriever as recited in claim 1, wherein said means for securing said loops on said end of said elongated pole comprises: an essentially cylindrical tip having an open-ended bore, said bore having a seat formed by an abrupt change in its diameter; a wire crimped around one end of said flexible loops, said wire being positioned in said open bore such that it engages said seat and retains ends of said flexible loops in said open bore; a water insoluble, cementitious material packed around said ends of said flexible loops in said open bore; and means for mounting said essentially cylindrical tip on said end of said pole.

10. A fishing lure retriever as recited in claim 9, wherein said means for mounting said essentially cylindrical tip on said end of said pole consists essentially of exterior threads on said end of said pole and matching interior threads on said open bore of said essentially cylindrical tip.

11. A fishing lure retriever as recited in claim 1, wherein said means for securing said loops on said end of said pole comprises: an essentially cylindrical tip having a bore open at one end and having a closed end with a plurality of holes, ends of said flexible loops being positioned in and through said holes and knotted in said bore; a water-insoluble, cementitious material packed around said ends of said flexible loops in said bore; and means for mounting said essentially cylindrical tip on said end of said pole.

12. A fishing lure retriever as recited in claim 11, wherein said means for mounting said essentially cylindrical tip on said end of said pole consists essentially of a blind rivet securing one end of said essentially cylindrical tip to said end of said elongated handle or pole.

13. A fishing lure retriever as recited in claim 1, wherein said means for mounting said loops on said end of said pole comprises a metal wire crimped around one end of said flexible loops and force-fitted in an open end of said pole.

14. A fishing lure retriever as recited in claim 13, wherein an end wall of said pole is deformed around said metal wire to prevent said metal wire from being removed from said open end of said pole.

15. The fishing lure retriever of claim 1, wherein said loops have sufficient stiffness to maintain their loop shape without a support frame, and have sufficient flexibility for said flexible loops to engage one or more free hooks of a snagged lure.

16. A fishing lure retriever, comprising:
an elongated pole;
a tip adapted to be mounted at one end of said pole;
means for removably mounting and securing said tip to one end of said pole;
a plurality of loops made of a resilient strand material, said loops having sufficient stiffness for said flexible loops to recover and maintain their loop shape without a support frame, and having sufficient flexibility for said flexible loops to engage one or more free hooks of a snagged lure, said loops being capable of being compressed between a snagged lure and said tip into a flattened arrangement around the lure as said lure retriever is brought toward the lure; and
means for securing said loops to said tip so that said loops extend outwardly from said pole when said tip is mounted on said one end of said pole.

17. The fishing lure retriever of claim 16, wherein said loops are made of a monofilament material.

18. The fishing lure retriever of claim 17, further comprising a fishing line guide mounted on said elongated pole near said end at which said tip is mounted, said fishing line guide including an open, spiral shaped eyelet for receiving a fishing line.

19. A tip assembly for a fishing lure retriever, comprising:
a tip having means for allowing said tip to be mounted at one end of a pole of a fishing lure retriever; and
a plurality of loops made of a resilient strand material and secured to said tip, said loops being flexible and capable of being compressed into a flattened arrangement around a lure but having sufficient stiffness to recover and maintain their loop shape, said loops extending outwardly from said tip.

20. The tip assembly of claim 19, wherein said strand material comprises a monofilament line.

21. The tip assembly of claim 19, further comprising at least five of said loops, said loops extending outwardly at different angles from said one end of said tip.

22. A fishing lure retriever, comprising:
an elongated pole;
a tip having an open bore at one end thereof, said bore being of sufficient diameter to admit an end of said pole;
means for securing said tip to said pole upon insertion of said pole into said bore; and
a plurality of resilient loops made of a strand material, said loops being flexible, said loops being capable of being compressed between a snagged lure and said tip into a flattened arrangement around the lure as said lure retriever is brought toward the lure but having sufficient stiffness to recover and maintain their loop shape, ends of said loops being embedded in said tip so that said loops extend outwardly from said pole when said tip is mounted on said end of said pole.

23. The fishing lure retriever of claim 22, wherein said tip further comprises a cementitious material disposed in said bore, said cementitious material being packed around said ends of said loops.

* * * * *